United States Patent
Tolle (10) Patent No.: US 8,752,006 B1
(45) Date of Patent: Jun. 10, 2014

(54) SYSTEM AND METHOD AND APPARATUS FOR AUTOMATICALLY GENERATING COMPUTER CODE FOR REMOTE PROCEDURE CALLS

(75) Inventor: Gilman Tolle, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1793 days.

(21) Appl. No.: 11/824,956

(22) Filed: Jul. 2, 2007

(51) Int. Cl.
 G06F 9/44 (2006.01)
 G06F 9/45 (2006.01)

(52) U.S. Cl.
 USPC ............ 717/106; 717/121; 717/136; 719/330

(58) Field of Classification Search
 None
 See application file for complete search history.

(56) References Cited

U.S. PATENT DOCUMENTS

| | | | |
|---|---|---|---|
| 6,366,967 B1 | 4/2002 | Wagner | |
| 6,563,427 B2 | 5/2003 | Bero et al. | |
| 6,622,301 B1 * | 9/2003 | Hirooka et al. | 717/149 |
| 6,819,908 B2 | 11/2004 | Spratt | |
| 6,990,653 B1 * | 1/2006 | Burd et al. | 717/108 |
| 7,020,867 B2 * | 3/2006 | Underseth et al. | 717/106 |
| 7,028,286 B2 * | 4/2006 | Larin et al. | 717/106 |
| 7,164,885 B2 | 1/2007 | Jonsson et al. | |
| 7,536,675 B2 * | 5/2009 | Gallagher | 717/106 |
| 7,617,459 B2 * | 11/2009 | Ho et al. | 715/762 |
| 7,624,370 B2 * | 11/2009 | Bibr et al. | 717/100 |
| 7,627,851 B2 * | 12/2009 | Lotter | 717/106 |
| 7,707,564 B2 * | 4/2010 | Marvin et al. | 717/140 |
| 8,291,374 B2 * | 10/2012 | Cullum et al. | 717/106 |
| 2002/0176391 A1 | 11/2002 | Hermann et al. | |
| 2003/0167444 A1 | 9/2003 | Zorc | |
| 2005/0076327 A1 * | 4/2005 | Helal et al. | 717/100 |
| 2005/0188351 A1 * | 8/2005 | Hoefler et al. | 717/106 |
| 2005/0289508 A1 * | 12/2005 | Illowsky et al. | 717/106 |
| 2006/0015856 A1 * | 1/2006 | Lotter | 717/136 |
| 2006/0070024 A1 * | 3/2006 | Park | 717/106 |
| 2006/0077940 A1 | 4/2006 | Ganji | |
| 2006/0136880 A1 * | 6/2006 | Sone et al. | 717/136 |
| 2007/0028208 A1 * | 2/2007 | Maki | 717/106 |
| 2007/0168926 A1 * | 7/2007 | Rajah et al. | 717/104 |
| 2007/0169015 A1 * | 7/2007 | Seelig et al. | 717/136 |
| 2007/0174818 A1 * | 7/2007 | Pasula | 717/136 |
| 2007/0234318 A1 * | 10/2007 | Seto et al. | 717/140 |
| 2008/0141216 A1 * | 6/2008 | Koseki et al. | 717/106 |
| 2008/0244508 A1 * | 10/2008 | Mantuano et al. | 717/106 |
| 2009/0077543 A1 * | 3/2009 | Siskind et al. | 717/136 |
| 2010/0031232 A1 * | 2/2010 | Glazier et al. | 717/106 |

OTHER PUBLICATIONS

Whitehouse et al., Marionette: Using RPC for Interactive Development and Debugging of Wireless Embedded Networks, IPSN'06, Apr. 19-21, 2006, pp. 416-423.*
Non-final Office Action from U.S. Appl. No. 11/516,841, mailed Oct. 14, 2008, 18 pages.
Final Office Action from U.S. Appl. No. 11/516,841, mailed Mar. 31, 2009, 21 pages.
Non-final Office Action from U.S. Appl. No. 12/002,640, mailed Jul. 20, 2011, 20 pages.
Non-final Office Action from U.S. Appl. No. 12/002,615, mailed Aug. 2, 2011, 31 pages.

* cited by examiner

*Primary Examiner* — Tuan Q. Dam
*Assistant Examiner* — Zheng Wei
(74) *Attorney, Agent, or Firm* — Fish & Richardson P.C.

(57) ABSTRACT

A system and method accepts source code for one or more procedures and, for those procedures flagged as being remotely callable, generates communication code and a description that allows the code to be remotely callable via a server using a variety of formats, such as conventional web services formats.

19 Claims, 6 Drawing Sheets

SYSTEM AND METHOD AND APPARATUS FOR AUTOMATICALLY GENERATING COMPUTER CODE FOR REMOTE PROCEDURE CALLS

FEDERALLY-SPONSORED RESEARCH OR DEVELOPMENT

This invention was made with Government support under contract HL052141 awarded by the National Institutes of Health. The Government has certain rights in this invention.

FIELD OF THE INVENTION

The present invention is related to computer software and more specifically to computer software for automatically generating data communications computer software.

BACKGROUND OF THE INVENTION

Many different portable devices can communicate with a gateway device. The gateway acts as a bridge between the wireless portable devices and the wired computer networks, such as the Internet. A gateway device may include a standard server, with additional software that allows communications to be made between the portable devices, which may be wireless, and devices with which the gateway may be in communication.

Developers may write custom application software for the portable devices. It may be desirable to allow the application software to receive commands from the gateway device and perform an action, such as moving the portable device, providing a perceptible signal, resetting a sensor, collecting data from a sensor, or providing a communication to a device to which the portable device may be attached or in proximity. The application software in the device may provide a response, even if the response is only an acknowledgement of receipt of a command.

For example, the application software in the device may contain certain procedures such as functions, and some of these functions the developer may wish to allow other devices to call. The developer may have put a great deal of thought into the data structures in the such functions or other procedures, and the developer may wish to reuse those same data structures when the functions or other procedures are called remotely.

However, providing such a communication facility in the device that would allow functions or other procedures to be remotely called requires the developer to program a communications subsystem, a tedious and time-consuming task that many developers would rather avoid.

The communication facility in the device is not the only modification that would be required in such a system. It would also be necessary to provide a facility to allow the gateway device to receive such commands from external sources in an easy to use format. Conventional Web services provide such a format, but there are several of these formats, and it can be can be tedious to write conversion software for the gateway that will accept commands in any of several Web services formats, reformat such a command into a command to send to the device, send the command to the device, accept the response, reformat it into one of the Web services formats, and finally return the response to the originator of the command. Not only is the software to perform all of these functions tedious to write, but it can also require knowledge of communications techniques and Web services formats that the developer of the application software for the device may not wish to learn.

Furthermore, different types of devices and different gateways may each use their own data formats, making the conversion of any format on the gateway to any format on the devices, in order to allow any device to communicate with any gateway, an unwieldy problem.

If the device is a portable device, it can be desirable to provide such communications between the gateway and the device using wireless transmissions. Because bandwidth in wireless transmissions may be shared among multiple devices sharing the same frequency, and capacity of a wireless network may be smaller than that of wired transmissions, it can be desirable to conserve bandwidth when providing such wireless transmissions. The developer could attempt to more compactly communicate with the gateway, but again, this capability would require additional tedious custom programming that many developers may wish to avoid, and expertise that they may not have.

If the developer were to develop remotely callable procedure calls and gateway server software described above, significant testing may be required to ensure that the remote procedure calls and server communications software are compatible. For example, if the gateway converts a command it receives in one format into a remote procedure call using a format that is inconsistent with the format of the remote procedure call, a call placed by providing a command to the gateway won't cause the device to perform in the manner expected. This compatibility testing can be a bane to the programmers or software testers, who must test for every possible mistake, but when a few such mistakes inevitably are not caught, they can seriously disrupt operation of an entire system.

Not only do these two systems require strict compatibility, but there is a third area for potential incompatibility, which is the web services description that outside parties use to develop the commands they send to the gateway. Typically, a programmer will write the description, which again, must be tested. The compatibility testing between these three areas is not only time consuming and tedious to perform, but the errors that inevitably slip through can again cause the system to operate improperly, and problems can be difficult to identify.

The significant compatibility testing between these three areas is thus a major source of frustration and expense.

It can be desirable for any solution to use a flexible approach to allow the gateway or server software to be generated. Different gateways may use different compiler software and their operators may desire to use different types of web services or other similar approaches to provide the interface with the senders of the remote procedure calls. Thus, allowing sufficient flexibility to choose the type of interface, and type of compiler can be helpful.

Because the devices may be mobile, they may move in and out of range of different gateways at different times. Requiring every gateway to have interface software for every possible device can be a logistical nightmare. It would be desirable if the server software did not have to be installed on every gateway.

What is needed is a system and method that can add a communication facility to an application program, that can allow a developer to mark certain procedures in an application program as remotely callable, and that can accept commands in one or more Web services or other formats that can call such procedures using a data structure that is at least similar to that used in the procedure in the application program, can reformat them for compact transmission via a wireless network, provide them to a device for execution, and receive and reformat any response into the format of a Web service, and that can accommodate any format incompatibilities between devices and gateways, that allows the gateway software to be flexibly tailored for the server capabilities and interface desired, that can allow a gateway to interface to new devices without requiring the gateway to maintain software for every device, without requiring the developer to provide the additional custom programming of a communication facility or test for incompatibilities between the software on the gateway and software in the devices that run the procedure calls and between the gateway software and the description such as a web service description.

SUMMARY OF INVENTION

A system and method accepts source code for a device, such as an independently-powered portable device capable of sending and receiving wireless transmissions, accepts a profile, and generates a Web services system for a gateway device or other server and any number of portable devices that is capable of accepting commands via a conventional Web services interface, or an interface that may be similar thereto; remotely operating any of one or more procedures on the device indicated as being remotely callable; and returning any responses from the procedures to the Web service requester from which a command was received.

To perform such functions, the system and method uses the profile and the source code to generate an entry in a new profile for each procedure in the source code for the device that is marked as being available to be called remotely, using a remote procedure call ("RPC"). The new profile can be provided to a server or gateway device, either shortly after the creation of the new profile, or by the device at a later time. The server or gateway device can use the new profile to build a description, such as a Web services description, and make it available to other parties using different devices in communication with the server or gateway device.

The server or gateway also uses the new profile to generate computer code that can allow the server or gateway to convert commands corresponding to the description to a remote procedure call that can be sent to the device to remotely call the corresponding procedure. The remote procedure call includes the argument values received, as well as an identifier of the procedure to which the remote procedure call corresponds, and a sequence number that the server associates with the device from which the command was received. The argument values ("arguments") are converted from the format in which they were received into a common format referred to as a network format, from which and to which devices that send and receive remote procedure calls are capable of converting to and from the format used by that device. The use of a common format simplifies the format conversions that could otherwise be required, as the gateway or server device, and the devices on which the procedures run, need only convert between their own device format and the network format. The argument values may be optionally packed to conserve bandwidth.

Software is generated for the device. The software generated receives the remote procedure call, optionally unpacks the arguments, converts the network formatted argument values into the format used on the device, and provides them to, and runs, the procedure. The software generated also returns any return values from the procedure to the server or gateway from which it received the remote procedure call, after converting them into network format and optionally packing them, and includes the sequence number from the remote procedure call.

The software on the gateway or server generated from the new profile receives the return values, optionally unpacks them, converts them into the format of the Web service, and, using the sequence number returned with the return values, provides them in the format to which they were converted to the device that sent the Web service command.

Because the system and method generates the software for these functions using the source code for the device and the profile, the developer need not write significant additional source code, other than to mark the procedures in the existing source code to indicate that they are remotely callable, and to link each such marked procedure to an entry in the profile the developer may create.

Because the code generated has a single source, much of the compatibility testing is eliminated, and what remains is greatly simplified.

Because the gateway software can be generated from the new profile, the device can provide the new profile to the gateway, either automatically, or upon request by the gateway, and the gateway can then generate the appropriate gateway software using the profile. Because the gateway uses the new profile to generate the gateway software, the gateway can tailor the gateway software to the capabilities of the gateway and to any number of desired interfaces, such as Web services interfaces.

DETAILED DESCRIPTION OF A PREFERRED EMBODIMENT

Figure 1:
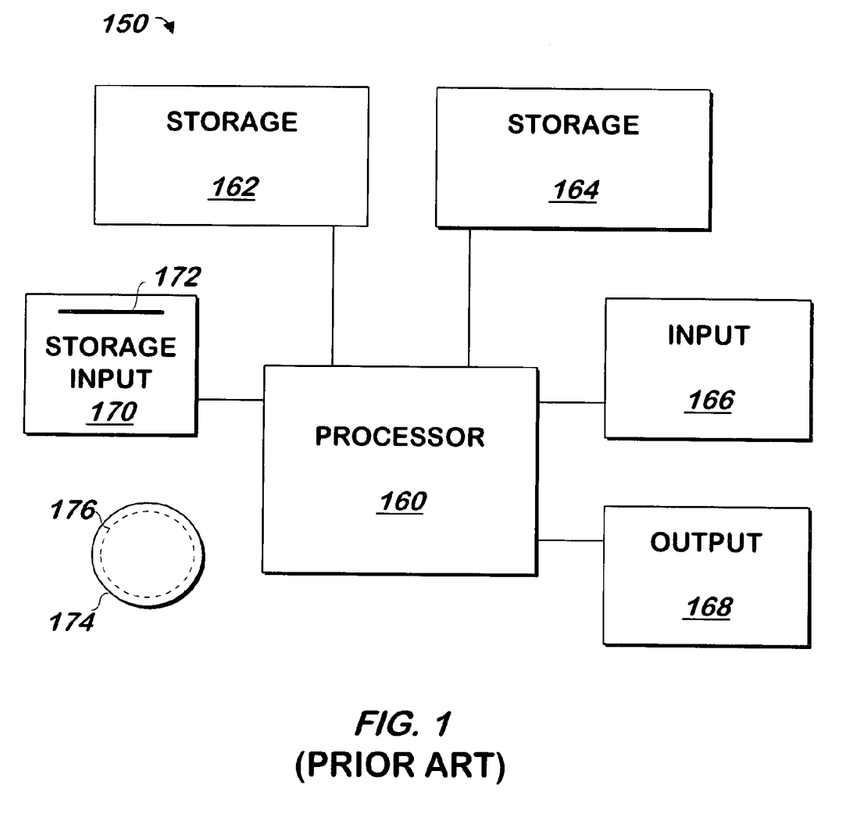
FIG. 1 is a block schematic diagram of a conventional computer system.

The present invention may be implemented as computer software on a conventional computer system. Referring now to FIG. 1A, a conventional computer system 150 for practicing the present invention is shown. Processor 160 retrieves and executes software instructions stored in storage 162 such as memory, which may be Random Access Memory (RAM)

and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE INCORPORATED of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used. In one embodiment, systems may be based on the conventional MSP430 commercially available from Texas Instruments, Inc., of Dallas, Tex., or the atmega128 commercially available from Atmel Corporation, of San Jose, Calif., or the PXA xscale commercially available from Intel Corporation of Santa Clara, Calif. Such systems may run the conventional TinyOS, commercially available from the web site of SourceForge.net or another operating system, such as a real time operating system.

The method of the present invention accepts source code intended for use on a device, as well as a profile, and adds to the source code, which may be compiled using a conventional compiler. The system and method provides a new profile based on the old profile and the source code. That profile may be provided directly to a gateway or server, or the new profile may be provided to the device, which may provide it to the gateway at a later time. The foregoing is described in more detail with reference to FIG. 2. The gateway accepts the new profile, converts it into source code for the gateway, or a separate server in communication with the gateway, that accepts commands and provides them as remote procedure calls to the device (a separate server can forward the commands to the gateway, which provides such remote procedure calls). This is also described with reference to FIG. 2.

The gateway or server receives commands, such as those in conventional Web services formats. In the case of the server, the server forwards the commands to the gateway, though it may perform some of the functions of the gateway if desired. The commands are reformatted and sent to the device on which the procedure calls execute. The foregoing is described in more detail with reference to FIG. 3. The device runs the remote procedure calls and returns any return values to the gateway device. Such processing is described in more detail with reference FIG. 4. The gateway device provides the return values to the device that sent the command, optionally via a server, described with reference FIG. 3.

As noted, a server may be separate from the gateway device. As described herein, the gateway device operates as a server for Web services communications, so it is not described as being separate, though a gateway can service one or more separate servers, with the collection of the gateway and the servers dividing up the functions described herein as being provided by the gateway using any divisions desirable.

Preparing Additional Code Using Device Source Code.

Figure 2:
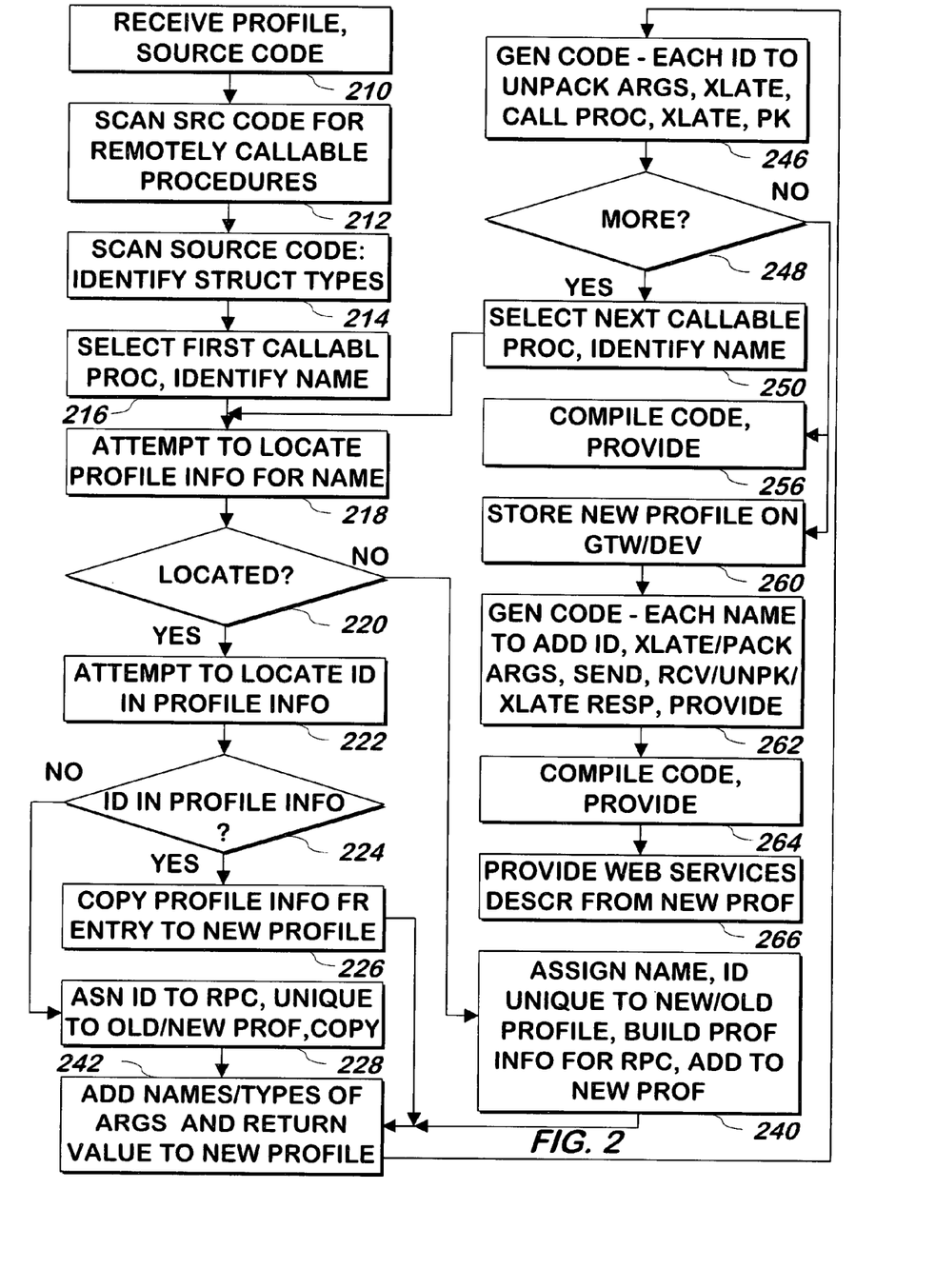
FIG. 2 is a flowchart illustrating a method of generating code for a gateway and one or more devices according to one embodiment of the present invention.

Referring now to FIG. 2, a method of preparing one or more gateways and one or more devices to communicate data is shown according to one embodiment of the present invention. Computer code capable of either running on a device or capable of being compiled and running on a device, and a profile for the computer code, are received 210 for use as described herein and below. In one embodiment, the device is moveable, and has a power supply that is not connected to a conventional power grid used by buildings in the area. For example, the device may be battery powered. There may be any number of the devices and a smaller number, such as one or more, gateways, communicating with such devices.

The profile contains profile information for one or more remote procedure calls, as described in more detail herein and below. In one embodiment, the computer code includes conventional computer source code, including any or all of compiler directives, functions, procedures and the like.

The computer code received is scanned 212 for remotely callable procedure declarations. As used herein a "procedure" includes any callable computer code, including, without limitation, procedures, functions, modules, subroutines, and goto points. In one embodiment, a remotely callable procedure differs from other procedures via the addition of a flag indicating that the procedure is to be remotely callable. The flag may include a name by which the procedure is remotely callable. For example, the flag and the name may be "@RPC (SetValue)", with the flag being "@RPC (Publicly Callable Name)" and the publicly callable name being "SetValue", included in the flag. It is noted that the Publicly Callable Name can be different from the name used to declare the actual procedure that is remotely callable. The declaration of a remotely callable procedure contains the flag, as well as the types of the arguments and return values used by that procedure, and includes a name of the procedure to be used by the compiler to reference that procedure, which, as noted may be different from the Publicly Callable Name contained in the flag.

The computer code received is scanned for type definitions or structured type definitions referenced in the remotely callable procedures located in step 212, and any such type definitions or structured type definitions are identified, parsed, and stored for use as described below 214. As part of step 214, if a type or structured type definition references other any other type definition or structured type definitions, that type definition is also identified, parsed and stored, until any structured type definition referenced in any remotely callable procedure declaration is defined in terms of basic types used by the compiler that would compile the source code supplied. In one embodiment, structured type definitions include the name of the structured type, and one or more of the elemental data types that make up the structured type. For example, a structured type may have a name "date" and contain three short integers: day, month and year. Another structured data type may have a name of "signature", and contain a graphic object and a date structured data type. In the event that the data type is a structured data type, the variable names of each of the variables in the structure definitions are stored, associated with the structured type.

The first remotely callable procedure declaration is selected and the name of the remote procedure call corresponding to that procedure (which may be the same as, or different from, the name of the procedure) is retrieved from the remotely callable procedure declaration 216. An attempt is made 218 to match the name in the remotely callable procedure declaration with any names in the profile received in step 210. If the name of the remotely callable procedure declaration matches an entry in the profile 220, an attempt is made to locate a remotely callable procedure identifier in the profile entry containing the matching name 222. In one embodiment, a remotely callable procedure identifier is a numeric identifier.

If a remotely callable procedure identifier is specified 224 (and in one embodiment if the remotely callable procedure identifier is different from any remotely callable procedure identifier stored in the selected profile information), some or all of the profile information from the matching entry in the profile received in step 210 is copied as an entry in a new profile 226, and an indication that the remotely callable procedure identifier was not assigned is also stored in the new profile entry as part of step 226. In one embodiment, the profile information may include the remotely callable procedure identifier and a text explanation of the procedure itself, including a description of any arguments to be provided to the procedure, their data types and any restrictions regarding the allowable values of the arguments, and similar information for return values of the procedure. A return value is a value returned by the procedure, such as the result of a function or variables in a procedure call. The method continues at step 242.

If there is no remotely callable procedure identifier in the entry with the matching name in the profile 224, a remotely callable procedure identifier is assigned that is different from the identifiers in the profile received in step 210 and in the new profile. The name, assigned remotely callable procedure identifier, and other profile information (for example, the description of the procedure) from the matching entry is copied as an entry in the new profile, along with an indication that the identifier was assigned 228, and the method continues at step 242.

If, at step 220, the name of the remotely callable procedure is not found in the profile received in step 210, an entry for the remotely callable procedure is added 240 to the new profile, such entry including the name from the remotely callable procedure declaration; a remotely callable procedure identifier that is different from all of the identifiers in the profile received in step 210 and the new profile; an indication that the identifier was assigned; and other optional information, such as an indication that no profile entry was located for the name. In one embodiment, the remotely callable procedure declaration itself is copied into the entry in the new profile as a description of the procedure, to allow users to see the argument and return value name and types to enable them to call the procedure remotely, and in another embodiment, no such information is copied. In one embodiment, a similar entry is also added to the profile received in step 210. The method continues at step 242.

At step 242, names and types of the arguments and return values are added to the entry in the new profile for the currently selected remotely callable procedure. The order of the names and order of the return values in the entry correspond to the order of the arguments specified in the remotely callable procedure declaration, and the order of the return values specified in the remotely callable procedure declaration.

In one embodiment, each of the types of the arguments and return values in the new profile are the network types of the arguments and return values, and thus step 242 includes converting each of the types of the arguments and return values from the host type of the device to one or more network types. As noted above, each argument and return value has two types on any device where it may reside: a host type and a network type. Although each type may be different, they may be the same. The host type is the type of the argument or return value as it exists in the host. In the case of a device, the host type may be any of the types that is used by the compiler, and the network type is the conversion of that type to a set of types that other devices can convert to or from.

In one embodiment, the network types are any of those described in Chang and Gay, "Language Support for Interoperable Messaging in Sensor Networks" SCOPES '05 Sep. 29-Oct. 1, 2005, Dallas Tex. (ACM 2005), including arrays of data types and structured types that may include arrays. In other embodiments, additions to these types may be used, or other basic data types may be used as the network types.

The type specified may be converted into a network type, one or more arrays of network types, or one or more structured network types (including one or more arrays), that most closely corresponds to the data type specified in the procedure declaration.

In the event that the data type is a structured data type, the variable names of each of the variables in the structure definitions are stored as part of the names and types stored in the new profile.

Following step 242, code is generated 246 for the new profile entry corresponding to the selected remotely callable procedure, such code being for execution on the one or more devices. The code for each new profile entry receives a remote procedure call in network format and uses the remotely callable procedure identifier in the remote procedure call to identify the next portion of the generated code to be called. That portion parses the data containing the arguments, optionally unpacks and translates the data containing the arguments, and calls the remotely callable procedure having the identifier specified in the remote procedure call. The portion of the code additionally receives, translates to network types, and optionally packs, return values, which are values returned by the procedure (e.g. the function result), into a response, and provides the response to the gateway device or other device corresponding to a sequence number received with the remote procedure call. In one embodiment, communications to and from the device are performed wirelessly.

The code for the one or more devices may incorporate the information included in the profile into the code, or the code may use the new profile as an input, and be reusable for different profiles.

Packing and unpacking may include removing and adding padding bytes where one or both host types uses padding bytes, for example to align a word having a multiple of two byte size (e.g. 2-bytes, 4 bytes, etc.) on a two byte boundary following or preceding, for example, a one byte word.

If there are more procedure declarations that are marked as remotely callable 248, the next remotely callable procedure declaration is selected, the name of the remote procedure call is identified 250 and the method continues at step 218 using the name and remote procedure call declaration selected.

In one embodiment, the code that receives the remote procedure call as described above is reused and need not be duplicated for each remote procedure call. The code generated for each remote procedure call adds to this code segment code that transfers control of the program to the portion of the code generated for that remote procedure call based on the identifier.

If there are no more remotely callable procedure call declarations 248, the method continues at steps 256 and 260.

At step 256, the code for the device or devices generated in step 246 that is not already in object code form, and the source code received in step 210, is compiled and provided to the device or devices. It is noted that some or all of the code may have been provided as described herein in object code form, and so the present invention does not require compilation, though in one embodiment, all code provided is provided in source code form, which is compiled.

At step 260, the new profile is stored, for example, on the gateway for use as described below, or the new profile may be stored on the one or more devices, which may provide the new profile to the gateway, for example, upon request or upon detection of a transmission path to the gateway, at a later time. In still another embodiment, the new profile is stored on a master server, with the address (e.g. the URL) of the new profile retained in the devices that will communicate with gateways that themselves communicate with software derived from the new profile. When a device communicates with a gateway for the first time, the gateway can request either the new profile or its URL. The device will provide either the new profile, or the URL, and the gateway will obtain the new profile using the URL.

The code for each entry receives a command to make a remote procedure call via the Web services format provided by that server or gateway (e.g. REST or SOAP), the command containing the name of the remote procedure call and values of the arguments; assigns a sequence number to the instance of the call; associates an identifier (such as the IP address of the caller) with the sequence number; obtains the identifier for the remotely callable procedure specified in the new profile from the name of the remote procedure call; translates the arguments from the Web services format, such as XML, that contains the names of each of the arguments and their values (with arguments having structured types containing the names and values of each component of the argument of the structured type, as well as the name of the argument, using a nested XML format in one embodiment), into the network types of the arguments specified in the new profile; orders them in the order specified in the new profile; optionally packs the translated arguments; and sends a remote procedure call to the device that can process such remote procedure call, the call containing the identifier, the arguments, and the sequence number assigned to that instance of the call. The code additionally receives the return value or values and the sequence number; optionally unpacks the return values; converts the return values from the network types into the Web services type of the return value; and provides the return values in such Web services format to the device from which the remote procedure call in Web services format was received, i.e. the device associated with the sequence number.

Translation may include changing the byte order, such as from big-endian to little-endian, or vice versa, or performing other translations, such as putting each character of a string into an array.

In one embodiment, the code generated is tailored using the information in, or information that will go into, new profile and some or all of this information is also built into the code. In another embodiment, the code is designed to accept the profile as an input and use the information from the profile as it operates. In this embodiment, the code is capable of being generated well in advance of the time the new profile is available. The code can be reused from one profile to the next. Such an arrangement may be used for the code in the gateway or server, but it may also be used for the code in the device if a provision is made to allow the procedures to be called in a variable fashion, for example, by placing the address of each procedure in a table of remote procedure call identifiers and such addresses, and allowing program control to be transferred using the table, with a provision made for passing the arguments to the procedures in the same manner that a compiler would pass such arguments.

In one embodiment, the code is generated to accept the command in a conventional Web services format, though there may be several versions of the code generated, one for each of several Web services formats. Other embodiments use other formats that are not conventional Web services formats. Such formats may be similar to Web services formats or entirely different.

The code is compiled and provided to one or more gateways or servers 264. Alternatively, the code generated in step 262 may be generated in object code form, in which case step 264 is not used.

At step 266, which may follow any of steps 260-266, a conventional Web services description or other similar description is built and provided, for example, to one or more servers, from the new profile. In one embodiment, the Web services description provides the description of the remotely callable procedure that was provided in the profile received in step 210 and copied into the new profile, or the description that was added as described above if no entry in the profile received was located, and the names of arguments and return values that may be provided and received in calling the procedure remotely, for example in the format corresponding to that Web service, such as the self-describing XML format of REST or schema definitions that employ the basic schemas of SOAP. A different Web services description may be provided for each Web service format supported by the code generated in step 262. In one embodiment, providing the web services description may include registering each callable function as a web service, via conventional UDDI techniques. UDDI information not described herein may be placed in the profile received from the developer and copied into the new profile.

Thus, the communication code in the device and the communication code in the gateway may both be based on the original one or more computer code files containing the procedures and/or their declarations. The web services description can be based off the computer code or the profile, which may be received as one of the one or more files, or both.

Processing Web Services or Other Commands.

Once the code has been built and stored on one or more gateways or servers, it is available for use. To use the code, a user can download the description from the server and then build a command that corresponds to the requirements of the description, for example, by providing to the server a message, file or stream of text containing a series of XML attributes and values that include the name of the remote procedure call, and argument names and values.

Figures 3, 4:
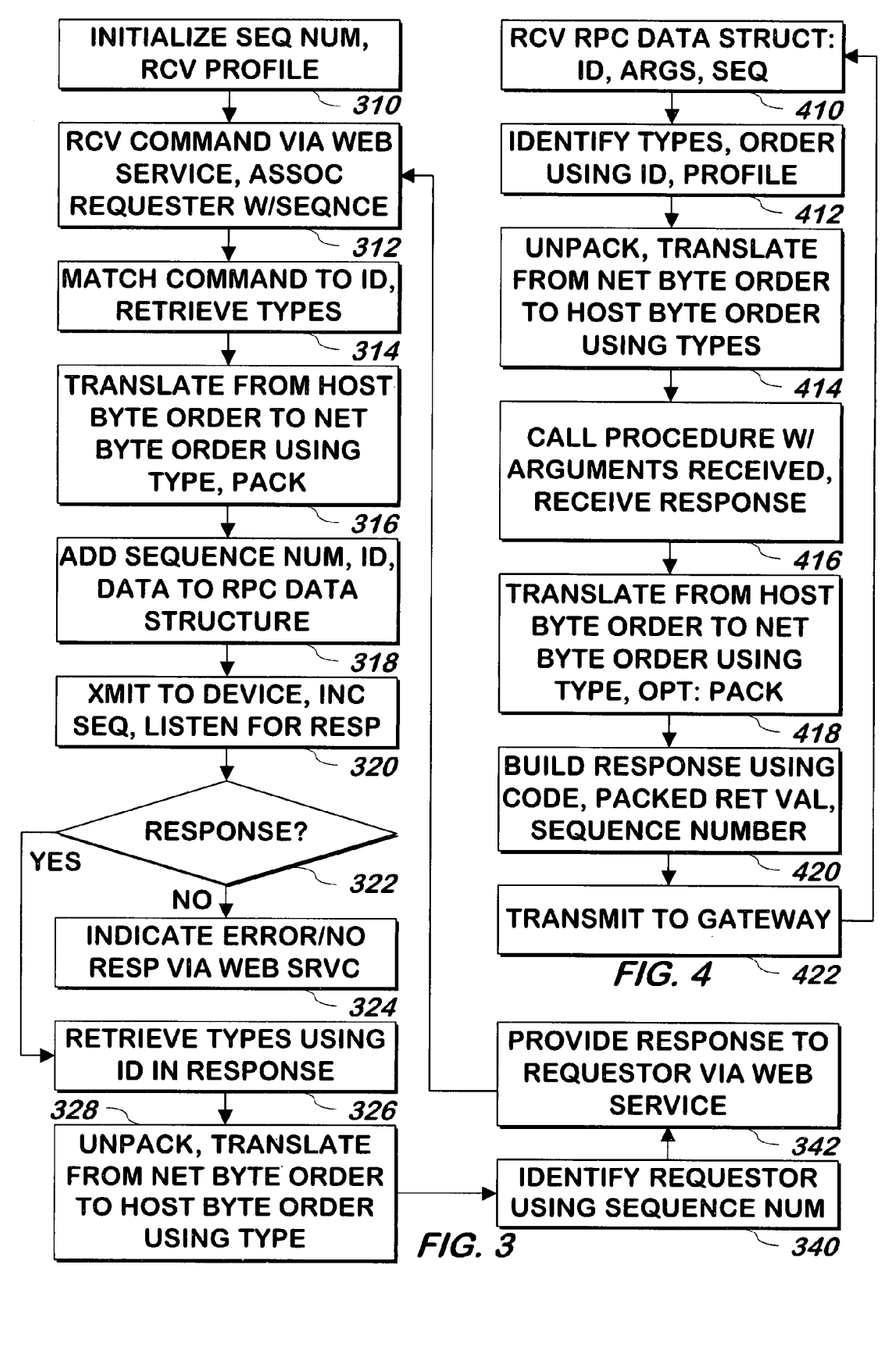
FIG. 3 is a flowchart illustrating a method of receiving a command, communicating an RPC corresponding to the command to a device and receiving one or more return values from the device and returning a response to the device from which the command was received according to one embodiment of the present invention.
FIG. 4 is a flowchart illustrating a method of processing a remote procedure call by a device according to one embodiment of the present invention.

Referring now to FIG. 3, a method of processing remote procedure calls is shown according to one embodiment of the present invention. The method of FIG. 3 operates the code built in step 262 of FIG. 2. A sequence number is initialized 310, for example to zero. In the embodiment in which the code uses the new profile, a profile, such as the new profile, is received as part of step 310. Such embodiment is assumed for the remainder of the description of FIG. 3 unless otherwise noted, though as noted the information from the new profile can be instead included into the code operated as described herein.

A command describing a remote procedure call is received for example via a Web service message and the requester sending the remote procedure call is associated with the current sequence number 312. The name in the command is matched 314 to the identifier of the remotely callable function using the new profile received in step 310, and the types and order of the arguments for the remote procedure call and the types of the return values are retrieved from the new profile. The types and order of the return value or values may be optionally stored, associated with the sequence number for use as described below, though such information can be looked up again by associating the identifier with the sequence number to allow the entry in the new profile to be located again.

A translation is performed from the host types to the network types using the types of the arguments retrieved in step 314 and the names of the arguments and the data may be optionally packed 316.

The translation is made using the code generated as described above. In one embodiment, translation is performed from a host type in the server or gateway performing the translation that corresponds to the new profile and the network types are those specified as described above. Translation may include format conversions of the host type to an identical network type, such as from Big Endian to Little Endian or vice versa, depending on the conventions used by the network and host types.

Packing may be performed to avoid some or all bytes in the network types that might otherwise be empty. Packing may be optionally performed according to any conventional set of rules that are used to pack and unpack such bytes.

The sequence number is added to the translated, optionally packed, arguments along with the identifier of the remote procedure call matched in step 314, to produce an RPC data structure that may be transmitted over the network 318.

The data structure is transmitted to the device 320, for example wirelessly, and the sequence number is incremented 320. As part of step 320, a response to the transmission is listened for. As described in more detail herein and below, in one embodiment responses include return values and the sequence number received with the transmission to which the response corresponds. If the response is not received within a threshold period of time 322, an error or an indication that no response has been received is provided using the Web service to the requester corresponding to the sequence number 324. Otherwise 322, the type or types of the return values are retrieved from the new profile using the sequence number or are retrieved from storage using the sequence number (if such types were stored in step 314) 326, and any packed bytes are unpacked, and translated 328 from the network types to the host types using the types from the new profile for each respective return value, in the same or similar manner described above. In one embodiment, such translation includes converting numbers to character strings suitable for providing in XML format.

The sequence number included in the response is used to identify the requester 340 that was associated with that sequence number in step 312. The response is provided 342 to the requester, i.e. the device that sent the command, for example using the format associated with the Web service with which the RPC command was received in step 312. The method continues at step 312, where a new RPC may be received. Any number of remote procedure calls may be received in this manner.

Processing the Remote Procedure Call at the Device.

Referring now to FIG. 4, a method of processing an RPC data structure by a device to which the RPC call had been transmitted, such as in step 320 of FIG. 3, is shown according to one embodiment of the present invention. The method of FIG. 4 may use the code for the device generated in the one or more instances of step 246 of FIG. 2. An RPC data structure is received 410, including the identifier of the RPC, the arguments, and a sequence number as described above. In one embodiment, the identifier is used to jump to the code generated for that identifier, though other embodiments use some of the same code for all identifiers and employ the new profile as a means of identifying the translations and unpacking that should be performed. Such unpacking and translations are performed to unpack and convert the network types into host types for that device. Such unpacking and conversions are done according to rules consistent with the rules for translation and packing to allow the arguments to be separately provided to the procedure in the host types corresponding to each argument.

The types and order of the arguments and return value or values are identified using the identifier and information from the new profile 412, which may be incorporated into the code or may be separate from the code, allowing the code to be reused for different profiles.

The arguments are unpacked and translated 414 from network byte order to host byte order using the types identified in step 412, as described in more detail herein. The function corresponding to the identifier is called using the unpacked, translated arguments received and the response provided by the function is received 416.

The response is translated from the one or more host types to the corresponding one or more network types using the type or types of the response identified in the new profile as described above (such information having been incorporated into the code in one embodiment), and the translated return value or values may be packed 418 as described herein. The packed return values and the sequence number received with the RPC data structure are built into a response data structure 420. The response data structure is transmitted to the gateway 422. The method continues at step 410. Any number of RPCs having any of a number of different identifiers may be processed in this fashion.

Data provided in this fashion may be provided, for example, using conventional REST XML or conventional SOAP XML-based communications. In one embodiment, the data thus provided, is provided in an XML or other representation of the same data structure used by the device that operates the procedure. Thus, a structured data type used by the device is faithfully reproduced in XML format or another similar format for the device from which the command was received.

Figure 5:
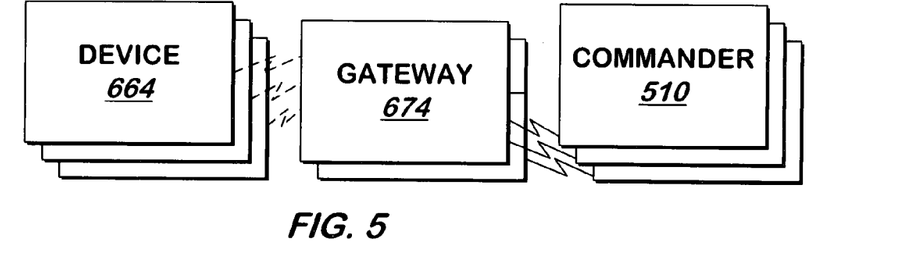
FIG. 5 is a block schematic diagram of a system containing devices of FIG. 7, gateways of FIG. 8 and commanders, the devices that send commands to the gateways and receive return values from the gateways

FIG. 5 is a block schematic diagram of a system including commanders 510, devices 664, and gateways 674. Commanders, such as commander 510, send commands to gateways, such as gateway 674, which provide as remote procedure calls data corresponding to the command to devices, such as device 664.

Each device, such as device 664, includes code capable of executing remotely callable procedures corresponding to such commands, and devices, such as device 664, provide return values to gateways, such as gateway 674, which in turn provide such return values to the commander, such as commander 510, from which the command was received, as described in more detail herein. Although three devices 664, three commanders 510, and two gateways 674 are shown as a representative example, any number of devices 664, commanders 510, and gateways 674 may be incorporated in other embodiments.

Figure 6:
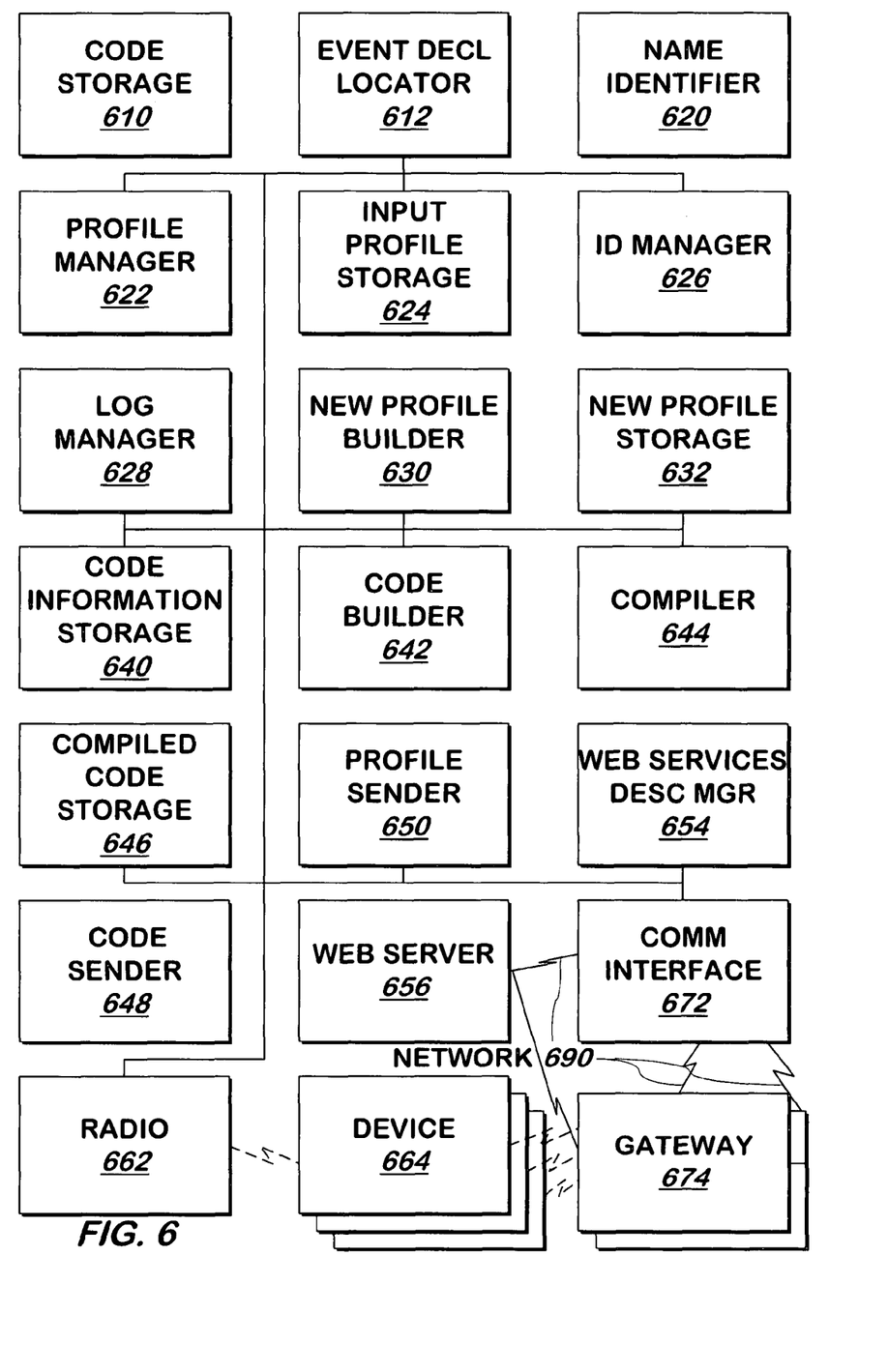
FIG. 6 is a block schematic diagram of a system for generating code for a device and a gateway according to one embodiment of the present invention.
Figure 7:
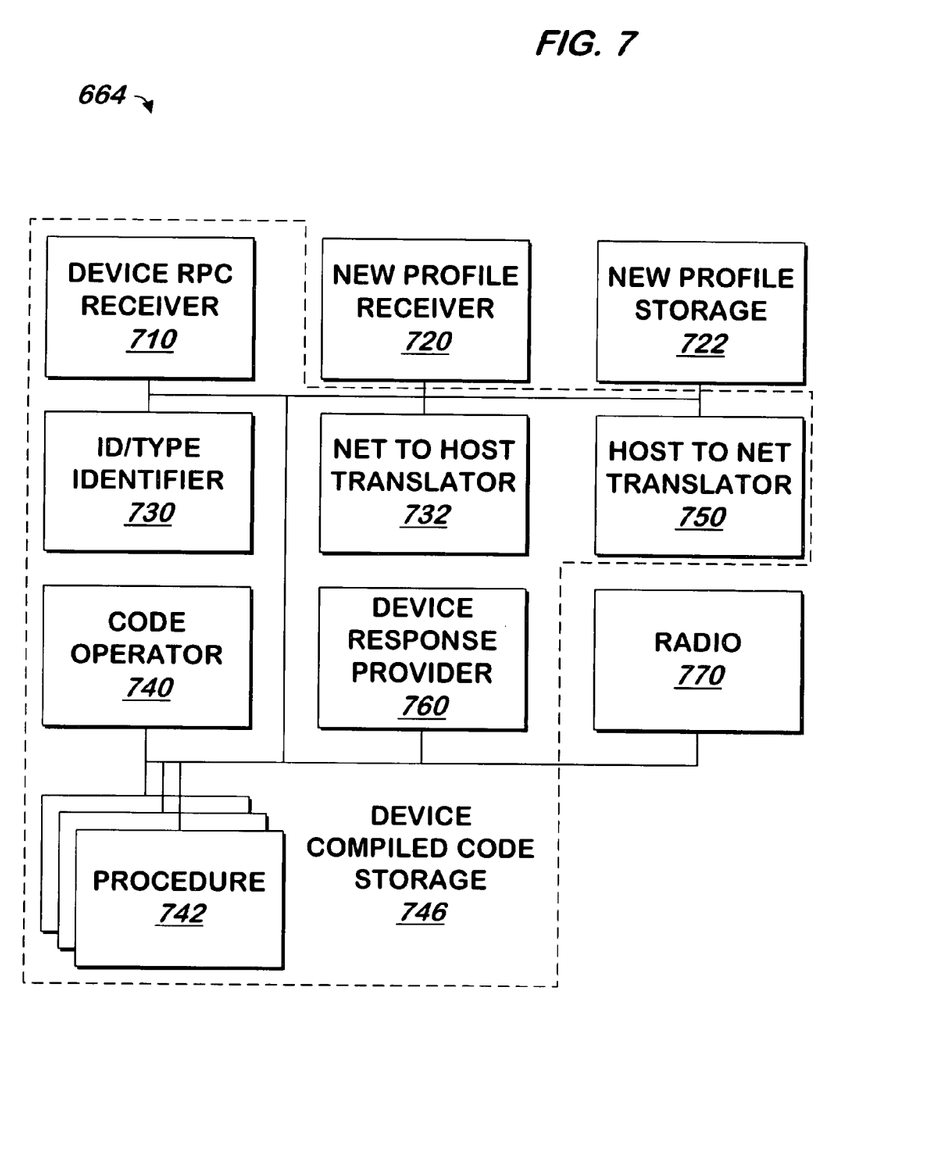
FIG. 7 is a block schematic diagram of a device for executing a remotely-called procedure according to one embodiment of the present invention.
Figure 8:
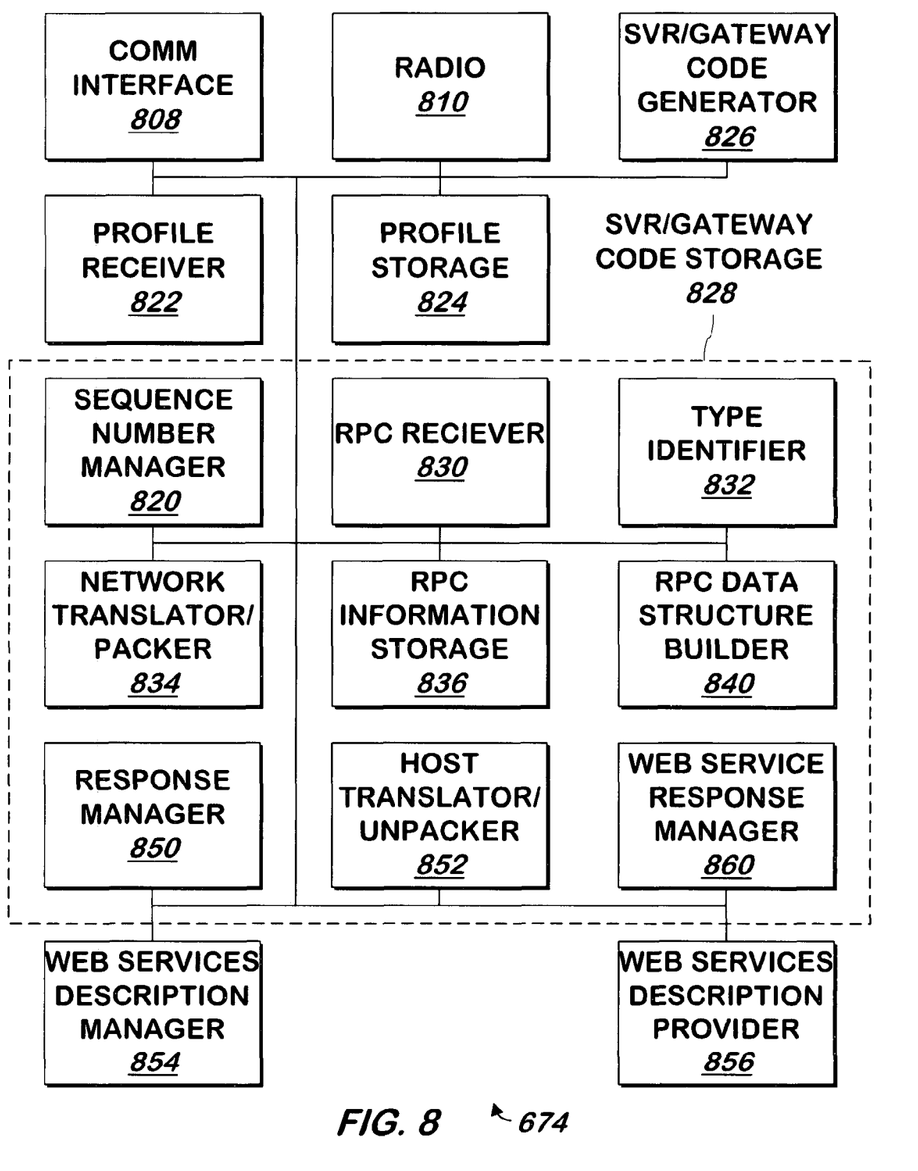
FIG. 8 is a block schematic diagram of a gateway system according to one embodiment of the present invention.

Code operating on devices 664 and gateways 674 operates the system. Such code is generated automatically from code written to operate the procedures that the remote procedure calls operate. Commanders identify the form of the commands via a description, such as a WSDL file, that is generated from the code and an optional profile, supplied in conjunction with the code. FIG. 6 is a block schematic diagram of a system for generating code for one or more devices 664 and one or more gateways 674, according to one embodiment of the present invention. FIG. 7 shows one device 664 in more detail, according to one embodiment of the present invention, and FIG. 8 shows one gateway 674 in more detail, according to one embodiment of the present invention.

Referring now to FIGS. 5, 6, 7, and 8, at system start-up, RPC/structured type definition locator 612 finds one or more conventional computer code files containing source code stored in code storage 610 and optionally a profile. The source code includes some or all of the source code for procedures, some or all of which have been flagged to allow then to be called remotely as described herein. In one embodiment, code storage 610 includes conventional memory or disk storage. RPC/structured type definition locator 612 scans the computer code file for remotely callable procedure declarations, as described herein and above. In one embodiment, such declarations differ from procedure declarations for procedures that are not call-able by being marked as described above.

RPC/structured type definition locator 612 selects the first of any remotely callable procedures located in the computer code file, and creates an RPC record for that remotely callable procedure in code information storage 640. In one embodiment, RPC/structured type definition locator 612 flags the RPC record as corresponding to the first remotely callable procedure (but does not so flag RPC records created for subsequent remotely callable procedures as described herein and below). RPC/structured type definition locator 612 adds the remotely callable procedure declaration, including the flag, to the RPC record in code information storage 640. In one embodiment, code information storage 640 includes conventional memory or disk storage. (In one embodiment, when RPC/structured type definition locator 612 selects the computer code file or files, RPC/structured type definition locator 612 discards any previously stored information for unrelated files in code information storage 640.)

In one embodiment, each remotely callable procedure declaration includes one or more argument names, and for each such argument name, an identifier of the corresponding data type, which may be a structured type or an elemental type as described herein and above. RPC/structured type definition locator 612 finds each argument name and corresponding data type identifier in the remotely callable procedure declaration, and determines whether the type is an elemental or a structured type. An elemental type is a type known by the compiler that will be used to compile the code for the procedure declaration and the procedure. In one embodiment, RPC/structured type definition locator 612 internally stores a list of data types that includes each of the elemental types defined as described herein and above.

If the data type is an elemental type, RPC/structured type definition locator 612 stores the argument name and corresponding data type identifier in an argument array in the RPC record.

If the data type is a structured type, RPC/structured type definition locator 612 resolves the structured data type into one or more names and elemental types using the type definitions contained in the files. RPC/structured type definition locator 612 stores the argument name and the identifiers of each of the elemental data types making up that structured type in the array.

In one embodiment, each remotely callable procedure also includes one or more return value names, and for each such return value name, an identifier of the corresponding return value data type, which may be a structured type or an elemental type as described herein and above. RPC/structured type definition locator 612 stores each return value name and the corresponding return value data type identifier or identifiers, resolving structured types into one or more names and elemental types, as described herein and above, in a return value array in the RPC record.

When RPC/structured type definition locator 612 has created and populated the RPC record as described herein, and stored the RPC record in code information storage 640, RPC/structured type definition locator 612 provides a pointer to the RPC record to name identifier 620, and also retains the pointer for use as described herein and below.

When name identifier 620 receives the pointer, name identifier 620 uses the RPC record to determine whether the remotely callable procedure declaration includes a specified publicly callable name as described herein. If name identifier 620 finds a specified name, name identifier 620 adds that name to a name field in the RPC record and 620 provides the pointer to the RPC record to input profile manager 622. Otherwise, name identifier 620 assigns a unique name and a unique identifier to the remotely callable procedure, each not assigned to any other procedure for the set of one or more files and not used by any other procedure in the one or more files, including the input profile, stores that name and identifier in the name and identifier fields of the RPC record, sets a flag in the RPC record indicating that the name was assigned, and provides a pointer to the RPC record to new profile builder 630.

When input profile manager 622 receives the pointer, input profile manager 622 retrieves the name from the RPC record. Input profile manager 622 compares that name to names included in one or more entries in an input profile stored in input profile storage 624. In one embodiment, the input profile contains one entry for each of any number of remotely callable procedures, with each entry containing a name for the procedure to which the entry corresponds, and other information such a text explanation of the procedure as described herein and above. In one embodiment, input profile storage 624 includes conventional memory or disk storage.

If input profile manager 622 finds in the input profile an entry with a remotely callable procedure name having the same name as the name included in the RPC record, input profile manager 622 selects the entry. Input profile manager 622 provides the pointer to the RPC record, and a pointer to the selected entry to identification manager 626. If input profile manager 622 does not locate the name, input profile manager 622 assigns an identifier to the RPC record and stores it in the RPC record, the identifier being unique to other identifiers used in the input profile or similarly assigned, sets a flag in the RPC record indicating that the identifier was assigned, and provides a pointer to the RPC record to new profile builder 630.

When identification manager 626 receives the pointers, identification manager 626 locates the profile entry. Identification manager 626 determines whether the profile entry includes a remotely callable procedure identifier. If so, identification manager 626 stores the remotely callable procedure identifier in an identifier field in the RPC record.

If no remotely callable procedure identifier is included in the entry having the pointer it receives, identification manager 626 assigns a remotely callable procedure identifier to the record, stores it in the remotely callable procedure identifier field in the RPC record and sets the flag in the RPC record indicating that the identifier was assigned. The identifier assigned is unique to those in all entries in the input profile and to assigned identifiers for the set of files. In either event, identification manager 626 also adds to the RPC record any optional additional information from the entry of the input profile corresponding to the pointer it receives.

When identification manager 626 has updated the RPC record and in one embodiment the input profile, identification manager 626 provides the pointer to the RPC record to new profile builder 630.

When new profile builder 630 receives the pointer, new profile builder 630 retrieves the RPC record in code information storage 640. If the RPC record is flagged as the first profile, new profile builder creates a new profile and stores the new profile in new profile storage 632, in one embodiment overwriting any previously stored profile. In one embodiment, new profile storage 632 includes conventional memory or disk storage. If the RPC record is not flagged, new profile builder 630 finds the new profile stored in new profile storage 632.

New profile builder 630 adds the remotely callable procedure identifier and the name from the RPC record to the new profile as a new entry. New profile builder 630 also adds to the new entry the argument names and corresponding data types, the return value names and corresponding data types, and any optional additional information from the RPC record, as well as the flags indicating whether the name and/or identifier was assigned, to the new profile, associated with the remotely callable procedure identifier. When new profile builder 630 has updated the new profile, new profile builder 630 signals RPC/structured type definition locator 612.

When so signaled, RPC/structured type definition locator 612 selects the next remotely callable procedure included in the one or more computer code files and initiates the same process as described above.

In this fashion, an RPC record is created for each remotely callable procedure declaration in the computer code file, a pointer to the next RPC record is included in each RPC record, and the information from each RPC record is added to the new profile.

If RPC/structured type definition locator 612 determines that no more remotely callable procedure declarations are included in the computer code file, RPC/structured type definition locator 612 signals new profile builder 630 to close the file, flags the last RPC record as being the last record, and provides the pointer to the first RPC record to code builder 642. In one embodiment, the RPC records are linked by RPC/structured type definition locator 612, and to flag the last one, RPC/structured type definition locator 612 links to a null pointer. RPC/structured type definition locator 612 also signals web services description manager 654 and profile sender 650, which proceed as described herein and below. When code builder 642 receives the pointer, code builder 642 uses the pointer to find the first RPC record in code information storage 640, and uses any pointer contained in that RPC record to find the next RPC record, and so forth until code builder 642 has located all the RPC records. Code builder 642 uses the RPC records to build computer software source code for a device, where the code corresponding to each RPC record receives a remote procedure call in network format and uses the remotely callable procedure identifier in the remote procedure call to identify the next portion of the generated code to be called, as described herein. The next portion of the generated code unpacks if necessary, and translates the arguments from the format in which they were sent into the format expected by the procedure, calls the procedure using the arguments, receives any return value from operation of the procedure, translates and/or packs the return values and provides them to a gateway, preferably the gateway from which the remote procedure call was received. The code for the one or more devices may incorporate the information included in the RPC record into the code, or the code may use the new profile as an input, and be reusable for different profiles as described herein and above. The operation of the code is described in more detail herein. When code builder 642 has built the code, code builder 642 adds the code to the set of one or more computer code files in code storage 610 and signals compiler 644.

In another embodiment, code builder 642 may generate such code after each new RPC record is completed. In this embodiment, RPC/structured type definition locator 612 provides the pointer to the competed RPC record to code builder 642 before, or as, RPC/structured type definition locator 612 selects the next remotely callable procedure and creates a new RPC record as described herein and above, and code builder 642 builds code corresponding to the RPC record to which the received pointer points and adds that code to the computer code file in code storage 610. In one embodiment, code builder 642 does not signal compiler 644 after adding the code to the computer code file, except in the case that the pointer to the next RPC record includes a null pointer or the last RPC record is otherwise encountered, and in this case code builder 642 does signal compiler 644.

When so signaled, compiler 644 compiles the one or more computer code files in code storage 610, using conventional compiler techniques, if such code is not already in object code form as noted herein and above. Compiler 644 stores the compiled code in compiled code storage 646 and signals code sender 648. In one embodiment, compiled code storage 646 includes conventional memory or disk storage. When signaled, code sender 648 provides the compiled code to one or more devices 664.

When signaled by RPC/structured type definition locator 612 as described herein and above, web services description manager 654 finds the new profile stored in new profile storage 632, and uses the profile to create a web services description, such as a WSDL file, as described above. The web services description contains information about calling the procedure using the gateway 674 to cause remote procedure calls to be performed in response to commands. The description may include any or all of format, order, and type information and any other information that may be used to call the procedure using gateway 674. Web services description manager 654 stores the web services description in web server 656. In one embodiment, web server 656 includes a conventional web server.

Although the generation of a web services description may happen centrally as described above, in another embodiment, the web services description is generated by the server, and thus is tailored to the server's specific implementation of the one or more commands that are to be used to cause the procedure to be remotely called. In this embodiment, the web services description manager 654 is not used, and is instead replaced by web services description manager 854 in each gateway or in another server. Web server 656 is replaced by web services description provider 756. Each of these are described below.

When signaled by RPC/structured type definition locator 612 as described herein and above, profile sender 650 finds the new profile stored in new profile storage 632, and provides the new profile to each of any number of devices 664, for example via radio 662. In one embodiment, radio 662 is a conventional IEEE 802.15.x-compatible radio that provides some or all of the capabilities described by one or more 802.15.x specifications. Radio 662 transmits and receives data over a wireless network, though wired networks may also be used. Other radios and/or protocols may be used, such as the conventional 802.11a/b/g/h or other similar protocols. The new profile is received by new profile receiver 720 of each device 664, as shown in FIG. 7 and described in more detail herein and below. Although in FIG. 6 three devices 664 are shown, any number of devices may be incorporated in other embodiments.

In one embodiment, profile sender 650 also or instead provides the new profile to each of any number of gateways 674, for example via network 690 using communication interface 672. In one embodiment, communications interface 672 is any conventional network interface such as a TCP/IP-capable communication interface, which may include a conventional modem, router, LAN interface card or the like, and network 690 is a network such as the Internet or a local area network or both. The new profile is received by profile receiver 822 of each gateway 674, as shown in FIG. 8 and described in more detail herein and below. Although in FIG. 6 two gateways 674 are shown, any number of gateways may be incorporated in other embodiments.

In one embodiment, profile sender 650 also, or instead, sends the new profile to web server 656, with a request to store the new profile and make it available to gateways 674. Web server 656 stores the new profile and returns a URL which may be used to request the new profile from web server 674, which may be coupled to a network such as the Internet. Profile sender 650 receives the URL and provides it to the devices that receive the compiled code, which receive the URL and store it.

In one embodiment, profile sender 650 does not provide the new profile to the gateway, and instead registration manager 780 of each device 664 provides the new profile or the URL of the new profile to profile receiver 822 of gateway 674 during a registration phase between the device and the gateway.

FIG. 8 is a block schematic diagram showing gateway 674 in more detail, according to one embodiment of the present invention. Referring now to FIG. 8, at system startup, sequence number manager 820 initializes a sequence number counter and stores the sequence number counter internally.

At any time, profile receiver 822 may receive a profile, for example via communication interface 808, from profile sender 650 of FIG. 6, and/or via radio 810 from registration manager 780 of FIG. 7 during a registration phase between device 664 and gateway 674 as described herein and above. The profile may be the new profile, created as described above. Profile receiver 882 may receive a URL from device 664 during a registration phase and may retrieve the profile from web server 656. In one embodiment, communications interface 808 is any conventional network interface such as a TCP/IP-capable communication interface, which may include a conventional modem, router, LAN interface card or the like, and communications interface 808 is coupled to network 690 of FIG. 6. In one embodiment, radio 810 is a conventional IEEE 802.15.x-compatible radio that provides some or all of the capabilities described by one or more 802.15.x specifications. Radio 810 transmits and receives data over a wireless network, though wired networks may also be used. Other radios and/or protocols may be used, such as the conventional 802.11a/b/g/h or other similar protocols.

When profile receiver 822 receives the profile, profile receiver 822 stores the profile in profile storage 824. In one embodiment, profile storage 824 includes conventional memory or disk storage. Profile receiver 822 also provides a pointer to the profile to sever/gateway code generator 826 and to web services description manager 854.

When web services description manager 854 receives the pointer, web services description manager 854 uses the information contained in the profile and information about how such information will be used to interpret commands to perform remote procedure calls to generate a web services description or other description that describes how such commands are to be provided by a user as described herein. Web services description manager 854 stores the web services description or other description into web services description provider 856, which may include a conventional web server. Because such description can be tailored to the way the software that interprets the commands will operate on that gateway 674, the web services description for the same or similar device or a device that uses the same or similar procedure may be different in each of two descriptions for different gateways. For example, the type of an argument may be specified differently for different gateways, with one type using one convention and another type using a different convention.

When server/gateway code generator 826 receives the pointer, server/gateway code generator 826 uses the profile to generate code for the each entry in the profile, where the code for each entry receives a command to make a remote procedure call via the Web services format and processes that command as described in more detail herein. More than one format may be supported in one embodiment, and the code and the description will reflect the format or formats supported by the gateway 674 to which the code and format correspond. Server/gateway code generator 826 stores the generated code in server/gateway code storage 828.

Operation of Generated Code.

Operation of the generated code, which is as shown in server/gateway code storage 828, will now be described in more detail. A user may retrieve the description from web services description provider 856 to determine the proper format of available procedures. Web services description provider 856 provides the profile to the requestor via communication interface 808. At any time, RPC receiver 830 may receive a command to perform a remote procedure call, or other type of command, for example via communication interface 808 as a web service as described herein and above. Communication interface is a conventional communication interface running conventional communications protocols, and may be coupled to an Ethernet network, the Internet, or both. In one embodiment, RPC receiver 830 receives an identifier of the requester, such as the requester's IP address, along with the remote procedure call command. When RPC receiver 830 receives the remote procedure call command, RPC receiver 830 requests and receives a sequence number, which in one embodiment is the current value of the sequence number counter, from sequence number manager 820. RPC receiver 830 associates that sequence number with the identifier of the requester, and stores the requester identifier, sequence number, and remote procedure call in RPC information storage 836. In one embodiment, RPC information storage 836 includes conventional memory or disk storage. RPC receiver 830 also instructs sequence number manager 820 to increment the sequence number counter, and sequence number manager 820 does so. When RPC receiver 830 has stored the remote procedure call command and associated information in RPC information storage 836, RPC receiver 830 provides a pointer to the stored remote procedure call command to type identifier 832.

When type identifier 832 receives the pointer, type identifier 832 locates the profile stored in profile storage 824. Although the profile is used in one embodiment, pre-processed information from the profile may be used instead. For example, the information from the profile may have been stored in a database.

In one embodiment, as described herein and above, the profile includes any number of remotely callable procedure identifiers and, for each remotely callable procedure identifier, a corresponding name, one or more argument identifiers and associated data types, and one or more return value identifiers and associated data types. Type identifier 832 uses the received pointer to locate the stored remote procedure call command, and locates any name or identifier included in the remote procedure call command. In one embodiment, each remote procedure call command includes the name or identifier of the remotely callable procedure being called. In the embodiment that each remote procedure call command includes a name, type identifier 832 uses the profile to determine the remotely callable procedure identifier corresponding to the name included in the stored remote procedure call command, and otherwise uses the identifier contained in the remote procedure call. When type identifier 832 has located or determined the remotely callable procedure identifier, type identifier 832 stores that remotely callable procedure identifier in RPC information storage 836, associated with the remote procedure call command.

In one embodiment, there may be multiple remote procedure call commands corresponding to many different profiles. In one embodiment, profile sender 650 adds a unique identifier to the profile before sending it. This unique identifier may also be used with the name or identifier of the procedure in order to distinguish it from other procedures with the same name or identifier.

Type identifier 832 also uses the profile or the information contained therein to identify the argument or arguments associated with the remotely callable procedure identifier, and the data types corresponding to those arguments. Type identifier 832 stores the identifier of each argument, and the data type or types corresponding to that argument, in RPC information storage 836, associated with the stored remote procedure call command. In one embodiment, the argument identifier(s) and corresponding data type(s) are included in the profile as an ordered list, and type identifier 832 stores the argument identifier(s) and corresponding data type(s) in the same order as they are given in the profile.

Type identifier 832 also uses the profile to identify the return value or values associated with the remotely callable procedure identifier, and the data type or types corresponding to each return value. Type identifier 832 stores the identifier of each return value, and the data type or types corresponding to that return value, in RPC information storage 836, associated with the stored remote procedure call command. In one embodiment, the return value(s) and corresponding data type(s) are included in the profile as an ordered list, and type identifier 832 stores the argument identifier(s) and corresponding data type(s) in the same order as they are given in the profile.

When type identifier 832 has stored the remotely callable procedure identifier and the argument and return value information in RPC information storage 836, associated with the remote procedure call command, type identifier provides the pointer to the stored remote procedure call command to network translator/packer 834.

When network translator/packer 834 receives the pointer, network translator/packer locates the stored remote procedure call command using the pointer. Each remote procedure call command includes arguments receivable by the remotely callable procedure. Network translator/packer 834 parses the remote procedure call to locate such arguments included in the remote procedure call command, and uses the argument data type information stored associated with that remote procedure call command to perform a translation from host type to network type, as described herein and above, and if necessary to rearrange the arguments included in the remote procedure call command into the order corresponding to the argument data type information. In one embodiment, network translator/packer 834 also packs the arguments as described herein. When network translator/packer 834 has translated, ordered, and optionally packed the arguments, network translator/packer 834 provides the arguments to RPC data structure builder 840, along with the pointer to the stored remote procedure call command in RPC information storage 836.

When RPC data structure builder 840 receives the pointer and the translated, ordered, optionally packed arguments, RPC data structure builder 840 builds an RPC data structure that may be transmitted over the network. RPC data structure builder 840 includes the received arguments in the RPC data structure, in an order corresponding to the order in which such arguments were provided according to a standard set of rules, and also includes in the RPC data structure the sequence number and remotely callable procedure identifier. The RPC data structure comprises a command to perform the procedure identified in the data structure using the arguments contained in the RPC data structure.

When RPC data structure builder 840 has built the RPC data structure, RPC data structure builder 840 transmits the RPC data structure to any number of devices 664 that include the code for responding to the remote procedure call command, such code being built as described herein and above. In one embodiment, the remote procedure call command stored in RPC information storage 836 identifies a specific device or group of devices 664 to which the remote procedure call data should be provided, and RPC data structure builder 840 transmits the RPC data structure to that device or group of devices 664, for example by including the identifier of the device or group of devices 664 in the RPC data structure, and/or by transmitting the RPC data structure on a physical or logical channel associated that only such device or group of devices 664 monitor. In another embodiment, RPC data structure builder 840 determines the device or group of devices 664 to which the RPC data structure should be provided, for example using data that may be received from the devices 664, or data that may have been previously provided to the devices 664, or static data that RPC data structure builder 840 may for example receive from a system administrator and internally store.

In still another embodiment, RPC data structure builder 840 broadcasts the RPC data structure to all devices 664. RPC data structure builder 840 may for example transmit the RPC data structure to the device(s) 664 via radio 810. In one embodiment, when RPC data structure builder 840 has transmitted the RPC data structure, RPC data structure builder 840 requests and receives a timestamp, for example from a conventional operating system (not shown), and stores the timestamp in RPC information storage 836 associated with the remote procedure call command.

The RPC data structure is received by the device(s) 664 and processed as described in more detail herein and below. At any time, such device(s) 664 may provide a response, and such response is received by response manager 850 via radio

810. When response manager 850 receives the response, response manager 850 uses the sequence number included in the response, as described in more detail herein and below, to find the stored remote procedure call command in RPC information storage 836 associated with the same sequence number. In one embodiment, if no stored remote procedure call command in RPC information storage 836 is associated with the same sequence number, for example because a response to that remote procedure call command has already been received from another device and only one such response is needed, or because the response is intended for a gateway 674 other than the gateway 674 in which response manager 850 resides, in one embodiment response manager 850 discards the response (or forwards the response to the intended gateway via a wired network). In another embodiment, all responses are provided to the originator of the corresponding command and in still another embodiment, responses having the same source are provided once, but responses from different source may be provided to the originator of the corresponding command. In one embodiment, the original remote procedure call command specifies how responses are to be provided and response manager responds accordingly, keeping track of which responses have been provided by indicating in RPC information storage 836.

If the response is to be provided, response manager 850 provides a pointer to the stored remote procedure call associated with the same sequence number as the received response to host translator/unpacker 852, along with the response received. Host translator/unpacker 852 proceeds as described herein and below.

In one embodiment, response manager 850 periodically, e.g. every second, checks the timestamps associated with any stored remote procedure calls in RPC information storage 836. In this embodiment, response manager 850 includes an internal clock, and if a timestamp is more than a threshold amount of time in the past, for example thirty seconds, response manager 850 determines that no response has been received to that remote procedure call. In this embodiment, response manager 850 provides the requester identifier associated with the remote procedure call to web service response manager 860, and web service response manager 860 provides an error or an indication that no response has been received to that requester via communication interface 808. In this embodiment, response manager 850 also deletes the remote procedure call to which no response was received from RPC information storage 836.

When host translator/unpacker 852 receives the response and the pointer from response manager 850 as described herein and above, host translator/unpacker 852 parses the response and locates the return values included in the response as described in more detail herein and below. Host translator/unpacker 852 unpacks those values if necessary according to a standard set of rules that was used to pack them. Host translator/unpacker 852 also uses the return value information stored in RPC information storage 836, associated with the remote procedure call command to which the received pointer points, to translate the return values from network type to host type, as described herein. In one embodiment, host translator/unpacker 852 associates the first return value provided in the response with the first return value identifier included in the stored return value information, and the second return value provided in the response with the second return value identifier included in the stored return value information, etc., until each return value has been associated with a return value identifier according to its unpacked, translated order. Host translator/unpacker 852 provides the unpacked, translated return values and any associated return value identifiers to web service response manager 860, along with the pointer to the stored remote procedure call.

When web service response manager 860 receives the pointer, the return values, and optionally the associated identifiers, web service response manager 860 uses the pointer to find the requester identifier associated with the stored remote procedure call in RPC information storage 836. Web service response manager 860 uses the requester identifier to provide the return values and any associated identifiers to the requester, for example via communication interface 808.

FIG. 7 is a block schematic diagram showing one device 664 in more detail, according to one embodiment of the present invention. Referring now to FIG. 7, at any time code receiver 712 may receive compiled code, via radio 770. Code receiver 712 stores such code into device compiled code storage 746. The code contains elements as described herein. In one embodiment, device compiled code storage 746 is the same as compiled code storage 646. At any time, new profile receiver 720 of device 664 may receive a new profile or a URL for the new profile, via radio 770, for example from profile sender 650 as described herein and above. In one embodiment, radio 770 is a conventional IEEE 802.15.x-compatible radio that provides some or all of the capabilities described by one or more 802.15.x specifications. Radio 770 transmits and receives data over a wireless network, though wired networks may also be used. Other radios and/or protocols may be used, such as the conventional 802.11a/b/g/h or other similar protocols.

When new profile receiver 720 receives the profile or URL, new profile receiver 720 stores the new profile or the URL in new profile storage 722. In one embodiment, new profile storage 722 includes conventional memory or disk storage. In one embodiment, as described herein and above, the profile includes any number of remotely callable procedure identifiers and, for each remotely callable procedure identifier, a corresponding name, one or more argument identifiers and associated data types, and one or more return value identifiers and associated data types.

At any time, device RPC receiver 710 may receive an RPC data structure, for example from RPC data structure builder 840 of gateway 674 as described herein and above. In the embodiment that RPC data structures may be received from more than one gateway 674, device RPC receiver 710 also receives an identifier of the gateway 674 from which the RPC data structure was received. When device RPC receiver 710 receives the RPC data structure, device RPC receiver 710 provides the RPC data structure and in one embodiment the gateway identifier to ID/type identifier 730. In another embodiment, the RPC data structure may be stored associated with any gateway identifier, and device RPC receiver 710 may provide ID/type identifier 730 with a pointer to the stored RPC data structure.

When ID/type identifier 730 receives the RPC data structure and any gateway identifier, or the pointer, ID/type identifier 730 parses the RPC data structure. As described herein and above, in one embodiment, each RPC data structure includes the sequence number, the remotely callable procedure identifier, and any number of arguments. ID/type identifier 730 compares the remotely callable procedure identifier included in the RPC data structure to the remotely callable procedure identifiers included in the new profile stored in new profile storage 722, or to a data structure containing such information received as compiled code and stored in new profile storage 722 by code receiver 712 as described herein and above, in order to identify the argument data types associated with that remotely callable procedure identifier in the new profile. ID/type identifier 730 unpacks the arguments included in the stored RPC data structure, and associates each argument with its corresponding data type, by matching the order of the arguments in the RPC data structure to the order in which the argument data types are listed in the new profile or other similar information. ID/type identifier 730 provides the unpacked arguments and associated data types, along with the sequence number and the remotely callable procedure identifier included in the RPC data structure, and any gateway identifier received, to net to host translator 732.

When net to host translator 732 receives the sequence number, remotely callable procedure identifier, arguments, and associated data types, net to host translator 732 uses the data type associated with each argument to translate that argument from network type to host type, unpacking them if necessary. Net to host translator 732 provides the translated arguments to code operator 740, along with the sequence number and remotely callable procedure identifier, and any gateway identifier received, When code operator 740 receives the arguments, sequence number, remotely callable procedure identifier, and optionally the gateway identifier, code operator 740 provides the arguments to a procedure 742 corresponding to that remotely callable procedure identifier. In one embodiment, code operator 740 and any number of procedures 742 correspond to the compiled code stored in compiled code storage 646 as described herein and above, and when procedure 742 receives the arguments, procedure 742 provides one or more return values to code operator 740. In one embodiment, the return values are ordered as specified in the new profile or other similar information. When code operator 740 receives the return values, code operator 740 provides the return values, along with the sequence number and the remotely callable procedure identifier, and any gateway identifier received, to host to net translator 750.

When host to net translator 750 receives the return values, sequence number, remotely callable procedure identifier, and optionally the gateway identifier, host to net translator 750 compares the received remotely callable procedure identifier to the remotely callable procedure identifiers included in the new profile stored in new profile storage 722, in order to identify the return value data types associated with that remotely callable procedure identifier in the new profile or other similar information. Host to net translator 750 uses the identified return value data types to translate each data type from host type to network type, if necessary. In one embodiment, host to net translator 750 also packs the return values. Host to net translator 750 provides the packed, translated return values, along with the sequence number and any gateway identifier received, to device response provider 760.

When device response provider 760 receives the return values, sequence number, and optionally the gateway identifier, device response provider 760 builds a response including the return values, which as noted may be ordered, and the sequence number. Device response provider 760 provides the response to gateway 674, in one embodiment using the gateway identifier, via radio 770, and the response is received by response manager 850 of gateway 674 as described herein and above.

Thus, a digital path (e.g. wired, wireless disc, or ROM) between the device of FIG. 6 and the device of FIG. 7, and a digital path between either the device of FIG. 6 and/or the device of FIG. 7 and the gateway or server of FIG. 8 allows transmission of the new profile. The new profile allows conversion between a first format of arguments used on the device, and a second format of arguments used on the gateway or other server, using a third format used for transmission between them, each format being the same or different to allow each format to be optimized or standardized as needed. Because the profile specifies the third format, the device, or the server or gateway need only to know how to translate between its own format and the third format, referred to as the network format. The system and method automatically builds the communication and conversion code on both the device and the gateway or server, using the source code, optionally with an input profile, to build such code, and to build a description of each remotely callable procedure. Because all of these things have the same source, compatibility issues are reduced or eliminated. In spite of the fact that code and description generation are automatic, because of the use of flags, the programmer can restrict the remote callability of the procedures to those flagged.

What is claimed is:

1. A computer-implemented method comprising:
   receiving files comprising source code and a profile for the source code;
   determining whether the source code in the received files contains instructions for a procedure that is performable, at least in part, by at least one of one or more devices; and
   responsive to determining that the source code in the received files contains instructions for a procedure that is performable, at least in part, by at least one of one or more devices:
      generating a new profile comprising profile information from the profile that relates to the procedure,
      generating a first set of code for at least one of the one or more devices that can perform the procedure, the first set of code calling the procedure in response to a first command,
      generating a second set of code for a gateway that enables the gateway to receive a second command and that enables the gateway to, in response to receiving the second command, provide the first command to at least one of the one or more devices that can perform the procedure, the gateway being configured to enable communications between the one or more devices,
      generating a description according to the new profile, the description specifying a means by which the second command can be received by the gateway, and
      storing, by one or more computers, the first set of code, the second set of code,
      and the description.

2. The method of claim 1, wherein the description comprises a Web services description.

3. The method of claim 1:
   wherein at least one of the one or more devices is a wireless portable device; and
   wherein the gateway acts as a bridge between the at least one of the one or more devices that is a wireless portable device and one or more wired computer networks.

4. The method of claim 1, wherein the first set of code additionally translates at least one data element having a first type different from a type defined for the procedure in the source code, and received as part of the first command into at least one second type defined for the procedure in the source code.

5. The method of claim 1, wherein the file contains at least one flag identifying the procedure.

6. The method of claim 1, additionally comprising identifying an identifier for the procedure.

7. The method of claim 1, wherein the first set of code is stored on at least one of the one or more devices that can perform the procedure; and
   wherein the second set of code is stored on the gateway.

8. A system comprising:
a code storage having an input configured to receive files comprising source code and a profile for the source code, the code storage being further configured for providing the code at an output;
a code generator having an input coupled to the code storage output for receiving the files, the code generator being configured to determine whether the source code contains instructions for a procedure that is performable, at least in part, by at least one of one or more devices, and being configured to, responsive to determining that the source code contains instructions for a procedure that is performable, at least in part, by at least one of one or more devices:
  generate a new profile comprising profile information from the profile that relates to the procedure,
  generate a first set of code for at least one of the one or more devices that can perform the procedure, the first set of code calling the procedure in response to a first command,
  generate a second set of code for a gateway that enables the gateway to receive a second command and that enables the gateway to, in response to receiving the second command, provide the first command to at least one of the one or more devices that can perform the procedure, the gateway being configured to enable communications between the one or more devices, and
  generate a description according to the new profile, the description specifying a means by which the second command can be received by the gateway.

9. The system of claim 8, wherein the description comprises a Web services description.

10. The system of claim 8:
wherein at least one of the one or more devices is a wireless portable device; and
wherein the gateway acts as a bridge between the at least one of the one or more devices that is a wireless portable device and one or more wired computer networks.

11. The system of claim 8, wherein the first set of code additionally translates at least one data element having a first type different from a type defined for the procedure in the source code, and received as part of the first command into at least one second type defined for the procedure in the source code.

12. The system of claim 8, wherein at least one of the one or more devices is a wireless portable device; and
wherein the gateway acts as a bridge between the wireless portable device and one or more wired computer networks.

13. A computer program product comprising a computer-readable non-transitory storage medium having computer readable program code embodied therein configured to cause one or more a computer systems to:
receive files comprising source code and a profile for the source code;
determine whether the source code in the received files contains instructions for a procedure that is performable, at least in part, by at least one of one or more devices; and
responsive to determining that the source code in the received files contains instructions for a procedure that is performable, at least in part, by at least one of one or more devices:
  generate a new profile comprising profile information from the profile that relates to the procedure,
  generate a first set of code for at least one of the one or more devices that can perform the procedure, the first set of code calling the procedure in response to a first command,
  generate a second set of code for a gateway that enables the gateway to receive a second command and that enables the gateway to, in response to receiving the second command, provide the first command to at least one of the one or more devices that can perform the procedure, the gateway being configured to enable communications between the one or more devices,
  generate a description according to the new profile, the description specifying a means by which the second command can be received by the gateway, and
  store the first set of code, the second set of code, and the description.

14. The computer program product of claim 13, wherein the description comprises a Web services description.

15. The computer program product of claim 13:
wherein at least one of the one or more devices is a wireless portable device; and
wherein the gateway acts as a bridge between the at least one of the one or more devices that is a wireless portable device and one or more wired computer networks.

16. The computer program product of claim 13, wherein the first set of code additionally translates at least one data element having a first type different from a type defined for the procedure in the source code, and received as part of the first command into at least one second type defined for the procedure in the source code.

17. The computer program product of claim 13, wherein the file contains at least one flag identifying the procedure.

18. The computer program product of claim 13, additionally comprising computer readable program code configured to cause at least one of the one or more computer systems to identify an identifier for the procedure.

19. The computer program product of claim 13, wherein the first set of code is stored on at least one of the one or more devices that can perform the procedure; and
wherein the second set of code is stored on the gateway.

* * * * *